(12) United States Patent
Gupta

(10) Patent No.: US 11,848,584 B1
(45) Date of Patent: Dec. 19, 2023

(54) INTELLIGENT SOLAR POWER BANK DEVICE

(71) Applicant: Antrish, Inc., San Diego, CA (US)

(72) Inventor: Ankit Gupta, San Diego, CA (US)

(73) Assignee: Antrish, Inc., San Diego, CA (US)

( * ) Notice: Subject to any disclaimer, the term of this patent is extended or adjusted under 35 U.S.C. 154(b) by 0 days.

(21) Appl. No.: 18/332,681

(22) Filed: Jun. 9, 2023

Related U.S. Application Data

(63) Continuation of application No. 18/328,614, filed on Jun. 2, 2023.

(51) Int. Cl.
  *H02J 7/00* (2006.01)
(52) U.S. Cl.
  CPC ........ *H02J 7/00714* (2020.01); *H02J 7/0063* (2013.01); *H02J 7/007182* (2020.01)
(58) Field of Classification Search
  USPC .................................................. 320/103, 112
  See application file for complete search history.

(56) References Cited

U.S. PATENT DOCUMENTS

| | | | |
|---|---|---|---|
| 8,013,567 B2* | 9/2011 | Windsor | H02J 7/0029 320/101 |
| 8,203,237 B1* | 6/2012 | Cowles | H02S 20/30 307/150 |
| 9,397,513 B2* | 7/2016 | Butler | H02J 7/0068 |
| 2014/0159509 A1* | 6/2014 | Inskeep | H02J 7/342 307/150 |
| 2017/0331162 A1* | 11/2017 | Clarke | H02J 7/007192 |

OTHER PUBLICATIONS

KR-20190012845-A Machine translation (Year: 2019).*

* cited by examiner

*Primary Examiner* — Samuel Berhanu
(74) *Attorney, Agent, or Firm* — JAQUEZ LAND GREENHAUS & MCFARLAND LLP; Bruce W. Greenhaus, Esq.

(57) ABSTRACT

An ultra-compact power bank device implementing a microcontroller based intelligent power routing mechanism for controlling power flowing from a solar panel and a battery to a USB port of a load device. The microcontroller controls a unique combination of simultaneously performed functions. A booster circuit provides higher voltage and fixed power at the output of the power bank.

25 Claims, 7 Drawing Sheets

INTELLIGENT SOLAR POWER BANK DEVICE

CROSS-REFERENCE TO RELATED APPLICATIONS— CLAIM OF PRIORITY

This application is a continuation of, and claims the benefit of priority under 35 USC § 120 of, commonly assigned and co-pending prior U.S. application Ser. No. 18/328,614, filed Jun. 2, 2023, entitled "Intelligent Solar Power Bank Device", the disclosure of which is incorporated herein by reference in its entirety.

BACKGROUND

(1) Technical Field

The disclosed method and apparatus relate generally to systems for powering devices from alternative power sources. In particular, the disclosed method and apparatus relates to a solar power bank for providing power and charging and having control systems for providing power to portable devices.

(2) Background

Self-contained power supplies are sometimes referred to as "power banks". Some power banks contain rechargeable batteries that function as a power charging source for portable devices like cellphones. FIG. 1 is a simplified illustration of one example of a power bank 100. In some cases, a power bank 100 may be connected through a power bank output port to a USB (Universal Serial Bus) port 103 of a portable device 102. In the example, the power bank 100 is connected to a portable device 102, such as a cellphone and to an external power source 104, such as a small solar panel (i.e., a device capable of generating electrical power in response to the application of sunlight) through an external power source port.

When the power bank 100 is connected to the portable device, the external power source 104 provides a source of power to the power bank 100. When the external power supply generates power by use of a solar panel, the amount of power provided by the external power source 104 depends on the strength of the sunlight and the angle at which the sunlight is striking the panel. Variation in the power provided by the external source 104 make it difficult or impossible to directly apply a constant flow of the power from the external source 104 to the portable device 102 which typically require constant power for charging.

Some current solar power banks manage this by applying the output of the external power source to an internal battery 106 within the power bank 100. The battery 106 then provides power to the portable device 102. This means that the energy derived from the external power source 104, such as a solar panel, is converted to chemical energy in the battery 106 before being applied as electrical energy to the portable device 102. This conversion of electric energy to chemical energy along a path 108 between the external power source 104 and the portable device 102 results in a loss of power due to energy conversion inefficiencies that are inherent in such a conversion. In addition, the lithium ion batteries that are typically used in power banks have a limited number of charge cycles (i.e., times the battery can be charged and subsequently discharged). This is typically approximately 300-500 cycles. Therefore, each time the battery is charged from a solar panel and discharged to the output load, the lifetime of the battery, and hence duration of the product life cycle, is reduced.

There is currently no solution that allows energy derived from a solar panel to be applied directly through a USB port to a portable device in a manner that satisfies the constant output power requirements of such devices and the requirements imposed by the industry standards that govern the operation of such USB ports. It is only by storing such solar derived power in a battery that such solar power banks currently provide constant power to such portable devices.

Furthermore, when solar power is generated at a rate that is equal to the power required to be provided to the USB port of the portable device, the power generated by the solar panel must still be transferred to battery prior to being provided to the USB port of the portable device. Accordingly, there is less power available for charging due to the inefficiency imposed by charging a battery within the solar power bank 100. The inability to use the solar generated energy in real time results in the need for higher capacity batteries, resulting in bulkier and less portable power bank devices.

Therefore, there is currently a need for a method and apparatus that sends power directly in real time to the USB port of a portable device and that minimizes the use of a battery in an intermediate device between the solar panel and the portable device, thus increasing the life of battery within the intermediate device.

SUMMARY

Various embodiments of a method and apparatus are disclosed for an ultra-compact power bank device implementing a microcontroller based intelligent power routing mechanism for controlling power flowing from a solar panel and a battery to a USB port of a load device. A direct path from a solar power source to the USB load to maximizes real time solar energy use and minimizes battery usage. The microcontroller controls a unique combination of simultaneously performed functions that includes i) input power detection, ii) flow control of battery power using control signals modulated with pulse width modulation and iii) implementation and feedback of a booster circuit to provide higher voltage and fixed power at the output of the power bank. The disclosed method and apparatus allows for embodiments having compact circuitry, efficient real time use of solar power and minimal battery usage, resulting in an extremely small form factor (about 50 mm×70 mm) power bank device which can be carried in the pocket along with a small solar panel.

BRIEF DESCRIPTION OF THE DRAWINGS

The disclosed method and apparatus, in accordance with one or more various embodiments, is described with reference to the following figures. The drawings are provided for the purpose of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

Figure 1:
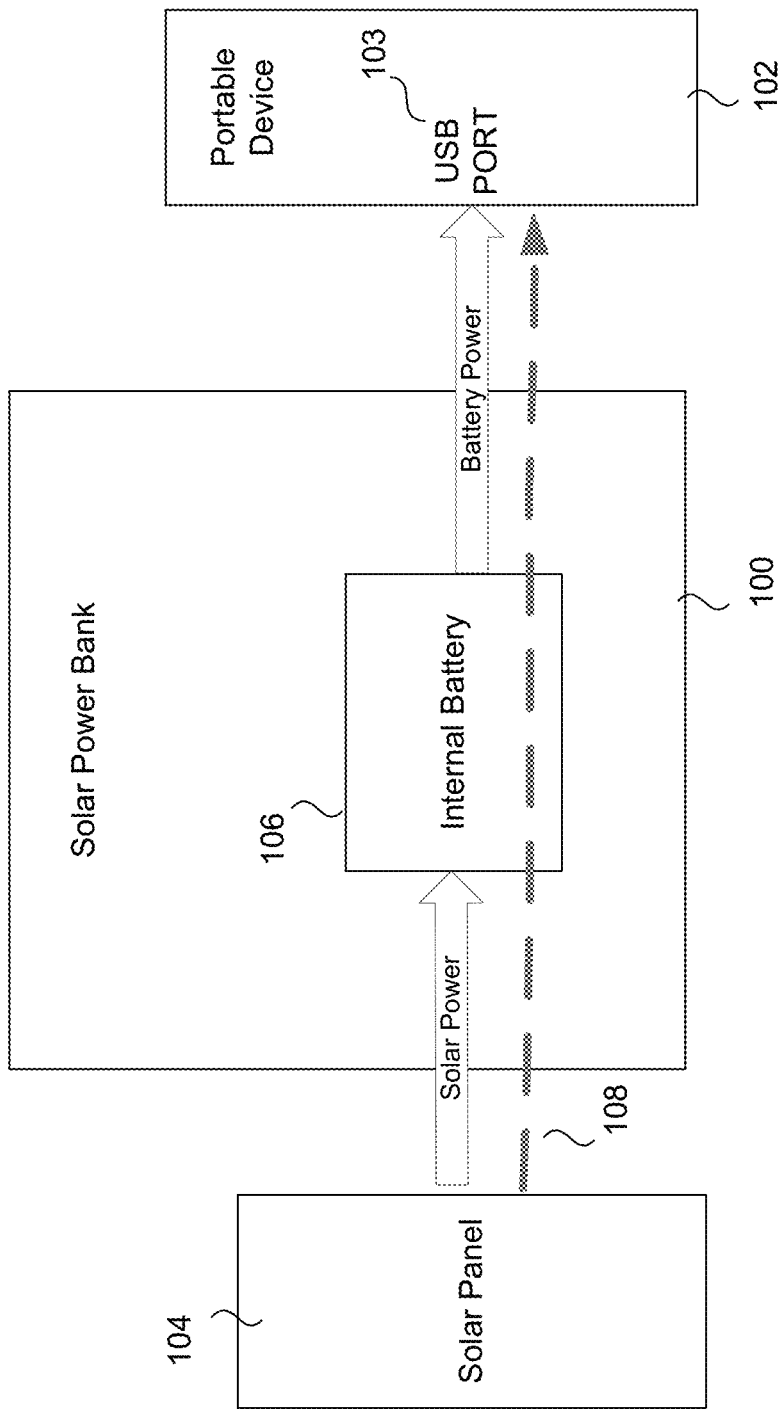
FIG. 1 is a simplified illustration of one example of a power flow in a typical power bank with solar input and USB output.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

A method and apparatus is disclosed that allows power to be directly applied from one or more external power sources (i.e., power generating devices, such as a solar panel) to a USB (Universal Serial Bus) port of a portable device to reduce the number of times a battery within the power bank is charged and subsequently discharged. By reducing the number of times the battery within the external power source is charged and discharged, the life cycle of the external power source is increased. In some embodiments, a power bank control device, such as a microcontroller, provides intelligent power routing to balance the amount of power provided from multiple external power sources to a load (such as device having a USB port), as well as when to use power from one or more of the external power sources to charge an internal battery of the external power source (e.g., a power bank).

In accordance with some embodiments of the presently disclosed method and apparatus, when constant power is not required to be provided to the USB port of the portable device, an ultra-compact power bank can send even small amounts of energy that have been generated by the solar panel (i.e., under low light conditions, such as low ambient sunlight conditions, moonlight, bulbs, candles, laser, etc.) directly to the USB port of the portable device to slowly charge the internal battery of the portable device.

In some embodiments, when both a cellphone having a USB port connected to a power bank, and the connected power bank are out of power, energy generated as a result of low ambient light captured by solar panel is sent directly to the USB port of the portable device. In some embodiments, when a control device, such as a microcontroller determines that incoming power from an external power source is equal to the expected constant output power or when a low power is provided from an external power source, the microcontroller can cause the power bank to enter bypass mode. In some embodiments, in addition, or alternatively, a bypass switch on the power bank places the power bank in bypass mode. Accordingly, a user can charge a portable device, such as a cellphone, directly from the power generated by a sub-optimal power source, such as a solar panel that is exposed to a low ambient light source. This removes the need to wait for a power bank battery to reach a certain charged voltage before starting the process of charging the internal battery of the portable device. Furthermore, the ability of the power bank of the disclosed method and apparatus to transfer power from a sub-optimal power source directly to the USB port allows a battery within the load to reach and maintain a fully charged state, even without an optimal power source to provide power to the load. In particular, the combination of the intelligent power control of the disclosed method and apparatus along with a solar panel, makes a cell phone behave as a steady power source gatherer/accumulator capable of gathering energy from ambient light. This can potentially keep the battery within the cell phone charged.

Figure 2:
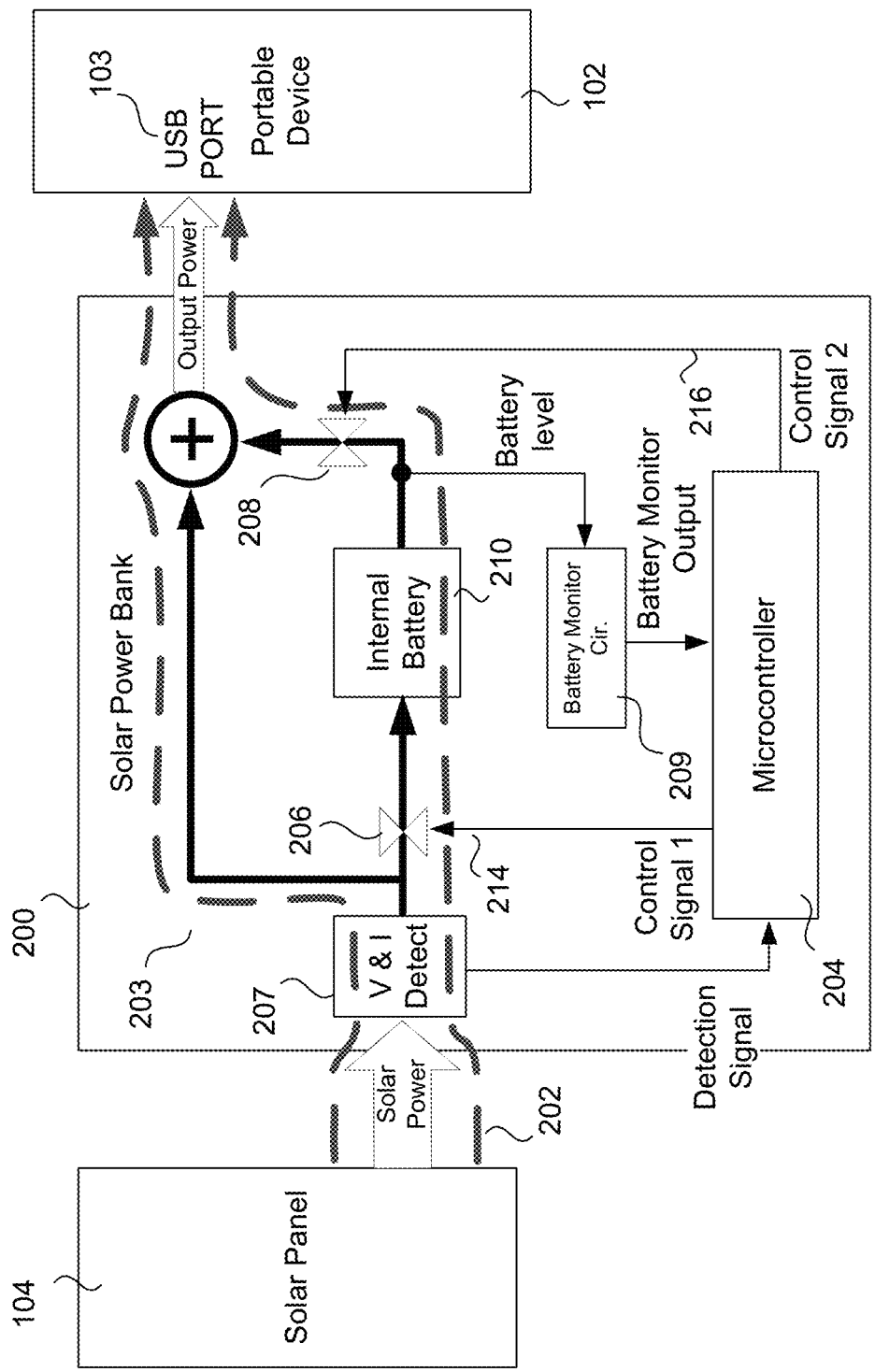
FIG. 2 illustrates one embodiment of the disclosed method and apparatus in which two paths are provided from a source of power to a USB port under the control of an intelligent routing mechanism.

FIG. 2 illustrates one embodiment of the disclosed method and apparatus in which two paths 202, 203 are provided from a source of power 104, such as a solar panel, to a USB port 103 of a portable device 102, such as a cellphone, under the control of an intelligent routing mechanism comprising a microcontroller 204 and two current control devices (CCDs) 206, 208 within a power bank 200, each having a current-in terminal, a current-out terminal and a control terminal, wherein each of the CCDs alters (e.g., inhibits) the current flowing therethrough in response to signals applied to the respective CCD control terminal.

In conventional solar power bank designs, the only path 108 (see FIG. 1) to provide power to the USB port 103 is through the battery 104. However, in the disclosed method and apparatus, in addition to a path 202 similar to the 108, a second path 203 allows power to be provided from the power source 104 directly to the USB port 103 of the portable device 102 without interacting with an internal power bank battery 210. Furthermore, power supplied from the battery 210 can be added to the power from the external power source 104 prior to being supplied to the USB port 103 of the portable device 102.

The microcontroller 204 establishes intelligent routing control of the flow of energy to the USB port 103 of the portable device 102. In some embodiments, the microcontroller 204 resides within the power bank 200. In some embodiments, the microcontroller 204 receives a detection signal on a detection signal line 205 from a voltage and current detection device 207. The detection signal provides information to the microcontroller 204 as to the precise amount of power being supplied by the external power source 104. In addition, microcontroller 204 is provided information regarding the amount of power required by the USB port 103 of the portable device 102. In some embodiments, this information is known at the time the power bank is being built and is provided by the designer when the microcontroller is configured (e.g., during production of the power bank 200). Further, a battery monitor circuit 209 coupled to the output from the battery 210 provides information to the microcontroller 204 regarding the battery level (i.e., the amount of charge within the battery 210 and the amount of current that the battery 210 can provide). In addition, the microcontroller 204 controls the two CCDs 206, 208 to determine the amount of current flowing from the current-in terminal to the current-out terminal of each CCD. In some embodiments, a control signal 1 on signal line 214 is coupled from the microcontroller 204 to the first of the two CCDs 206 to modulate the amount of current that flows into the battery 210 (i.e., between the external power source 104 and the battery 210).

Likewise, a control signal 2 on signal line 216 is coupled from the microcontroller 204 to the second of the two CCDs 208 to modulate the amount of current that flows out of the battery (i.e., between the battery 210 and the portable device 102). The microcontroller 204 can thereby modulate the current flowing through the CCDs (i.e., the "valves") 206, 208 to precisely control the amount of power that goes into and that comes out of the battery 210.

There are three scenarios that exist, depending on the amount of power being provided by the external power source and the power requirement of the USB port 103:

In the first Scenario, the power that the external power source is able to provide is less than the power required by the USB port 103, and the power required by the USB port 103 remains essentially constant. In this case, the microcontroller 204 prevents current from flowing through the first CCD1 206 to ensure that all possible current that can be provided by the external power source 104 is being routed to the USB port 103. In addition, the second CCD2 208 allows current to flow as is needed to supplement the current provided by the external power source 104 (i.e., to make up any deficit between what the external power source can provide and the requirement of the USB port 103).

In the second Scenario, the external power source 104 is capable of providing more power than the amount required to completely satisfy the requirement of the USB port 103, and the power requirement of the USB port is constant. In this case, the microcontroller 204 prevents any current from flowing through the CCD2 208 and controls the amount of current flowing through the CCD1 to allow any current above the amount required by the USB port 103 flow to the battery 210 and to charge the battery.

In the third scenario 3, the USB port 103 is powered solely from the external power source (full battery bypass mode), and variable USB output power is permitted by the USB port 103. In this case, either the power from the external power supply is equal to the expected constant power requirement of the USB port 103 (i.e., the load), or a low current flow from the external power source 104 is applied directly to the USB port 103 to allow a battery within the portable device 102 to slow charge. In either case, the microcontroller 204 sends the signal to stop the current from flowing through either of the CCDs 206, 208. Accordingly, current flows directly from the external power source 104 to the USB port 103, bypassing the battery completely. In some embodiments, the user can initiate bypass mode by activating a user bypass switch (see 342 in FIG. 3).

Figure 3:
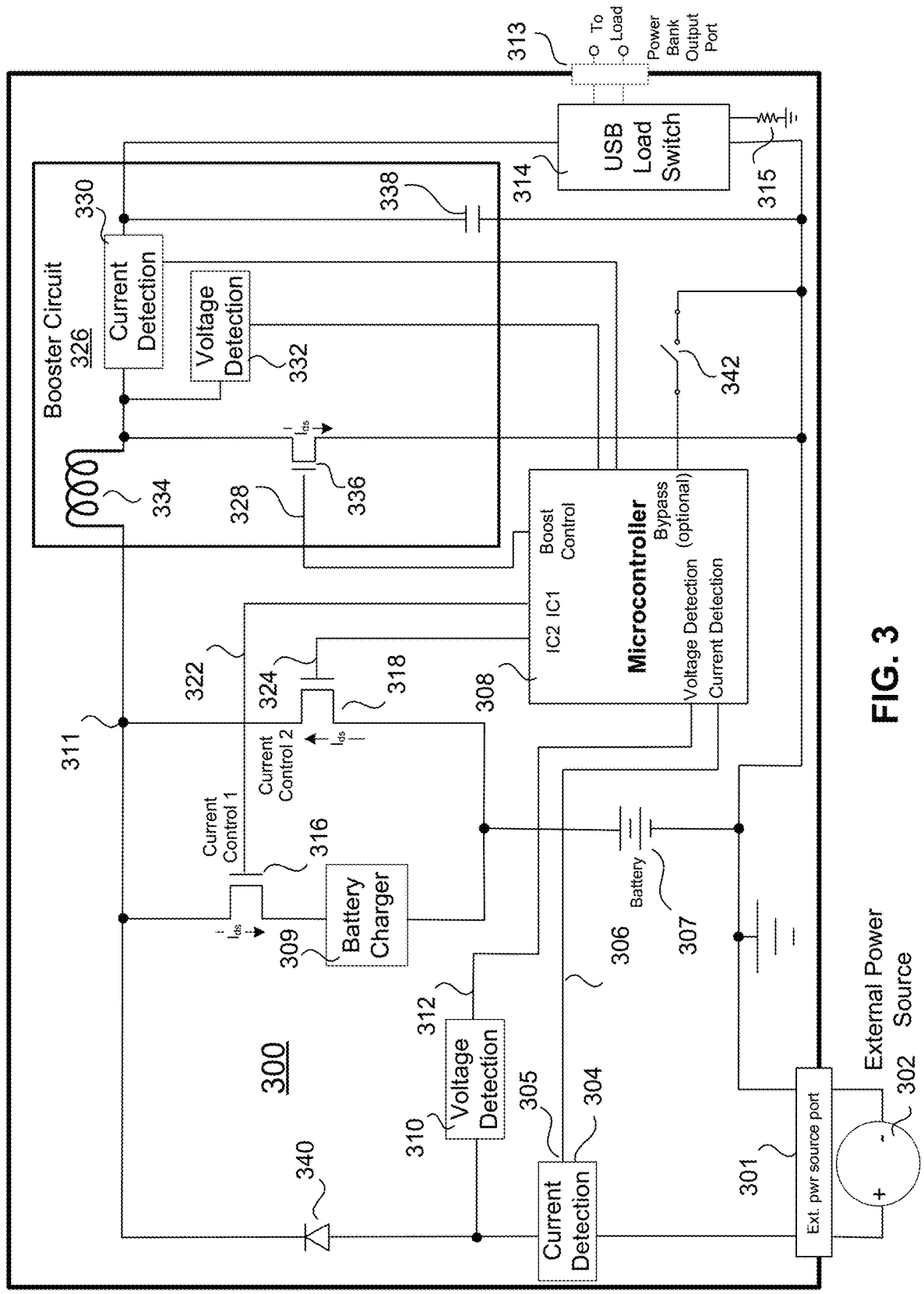
FIG. 3 shows a power bank in accordance with some embodiments of the disclosed method and apparatus in which the current control devices are Field Effect Transistors.

FIG. 3 shows a power bank 300 in accordance with some embodiments of the disclosed method and apparatus in which the CCDs are MOSFETs (Metal Oxide Semiconductor Field Effect Transistors). An external power source 302 is coupled to the power bank 300 through an external power source port 301. between a common (i.e., ground) connection and an input to a current detection device (CDD1) 304 within the power bank 300. The CDD1 304 may be as simple as a series low impedance across which the current flowing through the CDD1 304 drops a voltage that can be amplified, measured and output as an indication signal through a CDD1 indication terminal 305. In some embodiments, the series impedance is relatively low. Therefore, an amplifier is typically provided to amplify the detected voltage drop that occurs across the series impedance. A signal indicating the amount of current flowing through the CDD1 304 is coupled on a current detection signal line 306 to a current detection input of a microcontroller 308.

A voltage detection device (VDD1) 310 having a VDD1 voltage-in terminal, a VDD1 voltage-out terminal, and a VDD1 indication terminal, outputs a signal on the VDD1 indication terminal indicating the amount of voltage on being output from the external power supply 302 on a voltage detection signal line 312 to a voltage detection input of the microcontroller 308. In some embodiments, the VDD1 310 uses a resistor divider circuit (not shown) to detect the voltage. Accordingly, the microcontroller 308 can determine the voltage and current being provided by the external power source 302. These two values are provided as input signals to the microcontroller 308 so power provided by the external power source can be accurately calculated (i.e., Voltage× Current=Power).

The output of the external power source 302 is coupled (through the CDD1 304 and a load switch 313) to a load (not shown in FIG. 3). In some embodiments a load 314 is coupled to the power bank 300 through a power bank output port 313. In some embodiments, the load is a portable device, such as a battery powered cellphone. An internal power bank battery 307 within the power bank 300 is coupled to a battery charger 309. In some embodiments, the battery charger is implemented using a TP4056 linear Li-Ion battery charger integrated circuit chip available from Nan-Jing Top Power ASIC Corp. In some embodiments, the battery charger provides constant-current/constant-voltage linear charging to the battery 307. In some embodiments in which the load is coupled to the power bank 300 via a USB port, the load switch 314 is a USB load switch comprising an MT9700 integrated circuit chip, manufactured by XI' AN Aerosemi Tech. A resistor 315 coupled to the load switch 314 is used to configure (i.e., set) the maximum current that can be provided to a load connected through the load switch 314. Accordingly, for a USB Type A Spec 2.0 USB port, the constant maximum limit current is set to 500 ma (milliamperes) and for Spec 3.0 USB port, maximum current limit is set to 900 ma.

In one embodiment in which the output port is configured to interface with a load device having a USB 3.0 port, the microcontroller 308 is configured to provide power at 900 ma/4.5 W (Watt). In an embodiment, the power bank is coupled to a first external source that is a 5 W solar panel (i.e., supplies 5V (Volt)/1A (Amp)) and a second external source that is a 5 W crank generator (i.e., 5V/1A), the two external power sources being connected in parallel. The external power sources produce 2.5 W at their peak generation. The input power is the total of the power provided by the combination of the two (i.e., 5 W=5V(500 ma+500 ma). In this case, the microcontroller 308 provides 4.5 W to the output through the load switch 314 and the excess 0.5 W is provided to the battery 307.

A CCD1 is implemented as a MOSFET 316. It will be understood that any CCD can be used, including various other types of FETs and transistors in general. The gate of the MOSFET 316 (hereafter referred to simply as a FET for simplicity) is connected to a PWM (pulse width modulated) output voltage signal generated by the microcontroller 308 and communicated on a current control signal line 322. The microcontroller 308 controls the duty cycle of the output PWM signal to determine the relative amount of time that FET 316 allows current to flow from the drain of the FET 316 to the source of the FET 316. For example, if the microcontroller produces a signal with a period of 10 ms in which the FET 316 will be on for 10% of the period (i.e., a duty cycle of 10%), the resulting current can be smoothed to generate a relatively low constant current. In contrast, by producing a signal with a period of 10 mS in which the FET 316 is one for 90% of the time, (i.e., a duty cycle of 90%), the resulting current can be smoothed to generate a relatively high constant current. In this way, the PWM control signal from the microcontroller 308 sets the amount of current that flows through the FET 316, and so the amount of power that flows into the battery 317 through the battery charger 320 is controlled. In some embodiments, the microcontroller 308 maintains a constant current at the power bank output port 313 to meet the requirements of a load to which the power bank output port 313 is connected. Accordingly, the current provided to the load does not vary by more than an acceptable amount, as determined by the microcontroller 308.

Similarly, a CCD2 is implemented as a FET 318. The gate of the FET 318 is also connected to a PWM output voltage signal generated by the microcontroller 308 and communicated to the gate of the FET 318 on a current control signal line 324. The microcontroller 308 controls the duty cycle of the output PWM signal to determine the amount of time the FET 318 allows current to flow through the FET 318. Accordingly, the PWM signals allow the microcontroller 308 to dynamically set the amount of current that will flow out of the battery. An output current detection device (CDD2) 330 and an output voltage detection device (VDD2) 332 provide the microcontroller 308 with information regarding the voltage and current being provided to the load 314.

In some embodiments, the battery 307 is a lithium ion battery having a voltage of 3.7V. However, the industry standard specification for a USB port requires the voltage that is provided to such a USB port to be 5V. Therefore, in some embodiments, a booster circuit 326 is needed to boost the input voltage to the desired 5V. In some embodiments, the booster circuit 326 comprises an inductance 334, a booster FET 336 and boost capacitor 338. Booster circuits are known, as can be seen at URL: https://en.wikipedia.org/wiki/Boost_converter.

The voltage to be boosted is the parallel combination of the voltage provided by the battery 307 and the voltage provided by the external power source 302. This combined voltage appears at a combined voltage node 311 in the power bank 300. Since the voltage output from the battery 307 and the voltage output from the external power source 302 are in parallel, the voltage at the point 311 will be the greater of these two voltages. If neither is at the desired 5V level, then the voltage is boosted to the desired 5V output. This is done by the microcontroller 308 providing a pulse modulated signal on signal line 328 that is applied to the gate of the boost FET 336. The pulse modulated signal turns the booster FET 336 on and off on a duty cycle determined by the microcontroller 308 to give the desired boost. When the booster FET 336 is on, current flows through the inductance 334 storing energy therein. When the booster FET 336 is off, the inductance 334 transfers the stored energy to the booster capacitor 338. That is, the inductance 334 is in series with the combined parallel output of the battery 307 and the external power source 302. Voltage generated across inductance 334 is in series with the voltage at 0311. This results in a higher output voltage at the load 314. By adjusting the duty cycle of the PWM signal applied to the gate of the boost FET 336 5V voltage is provided to the load switch 314. In this way, the booster circuit 326 outputs a constant 5V voltage. In addition, the microcontroller 308 can set the duty cycles of PWM on the current control 2 signal on signal line 324 to increase or decrease the current from the battery 324 and thus ensure that the constant USB current requirement is met at the output of the booster circuit 326. So, for example, if low current is detected at the output of the booster circuit 326 by the CDD2 330, the microcontroller 308 opens the output FET 318 to allow more current to flow and hence more power to be drawn from the battery, thus ensuring constant power to the USB load 314.

It should be noted that the current provided to the load 314 is the sum of the current flowing through the FET 318 and the current supplied by the external power source 302. Accordingly, if the current provided by the booster circuit 326 is lower than the required current, the microcontroller 308 provides a current control signal to the gate of the FET 318 to cause more current to flow to the load 314 by pulling power from the battery 307, and thus ensuring constant power to the load 314. A diode 340 provides a block to current that might otherwise flow from the battery 307 to the external power source 302.

It will be understood by those skilled in the art that the input power detection and fine tuning control of power that flows to and from the battery 307 by using PWM signals to control the amount of current that flows through the two FET 316, 318 under the control of the microcontroller 308 can be used in broader applications as well. In some embodiments, intelligent logic is provided using firmware programming.

Accordingly, embodiments of the presently disclosed method and apparatus provide direct/real time channeling of power derived from an external power source, such as a solar power source, to a portable device having a USB port without need to convert energy from one form to another and without the need for a battery for storage of the energy prior to applying it to the USB port. This saves battery life and reduces power conversion loss. Under ideal conditions, the solar power that is output from a solar power source will match the required USB power. In such cases, the battery within the power bank is completely bypassed with no usage and degradation. This will lead to 100% renewable energy usage. In some embodiments, a user bypass switch 342 is present on the power bank 300 to allow a user to activate bypass mode. In some embodiments, the user bypass switch 342 is coupled to the microcontroller 308 and provides an indication to the microcontroller 308 when the user bypass switch 342 is activated. The microcontroller 308 responds by closing the current paths to and from the battery 307 within the power bank 300 (i.e., turning off both FETs 316, 318) to alter (e.g., inhibit) current from flowing through the two FETs 316, 318.

The presently disclosed method and apparatus for accurately controlling of the amount of power that flows to and from the battery within the power bank under the control of the microcontroller can be applied to any external power source. Such control over the flow of energy to and from the battery of the power bank allows any one of a variety of input power sources that are inherently variable (e.g., solar panels of different wattages/voltages, DC voltages, wind energy, crank generator) to provide a fixed power source at the output of the power bank to be supplied for use by a USB device (i.e., a device having a USB port through which the device receives external power), a 5V DC port of an external device, etc.).

In some embodiments of the disclosed method and apparatus, a direct pathway from solar panel to USB allows even small energy captured by the solar panel to be used for USB charging (assuming that constant power is not a requirement). Therefore, even minimal ambient light energy falling on a solar panel (e.g., lights bulbs, moon, twilight) can be sent to a USB port of an external device to allow slow charging of the device (i.e., a cell phone, etc.). In some embodiments, devices may be held in a perpetually charged state due to the slower charging of the device from the available ambient energy captured by a solar panel.

Microcontroller algorithms can be used to customize and fine tune the control of power flow models. This allows combining of multiple variable power sources for different output power requirements, especially in a renewable energy domain.

Figure 4:
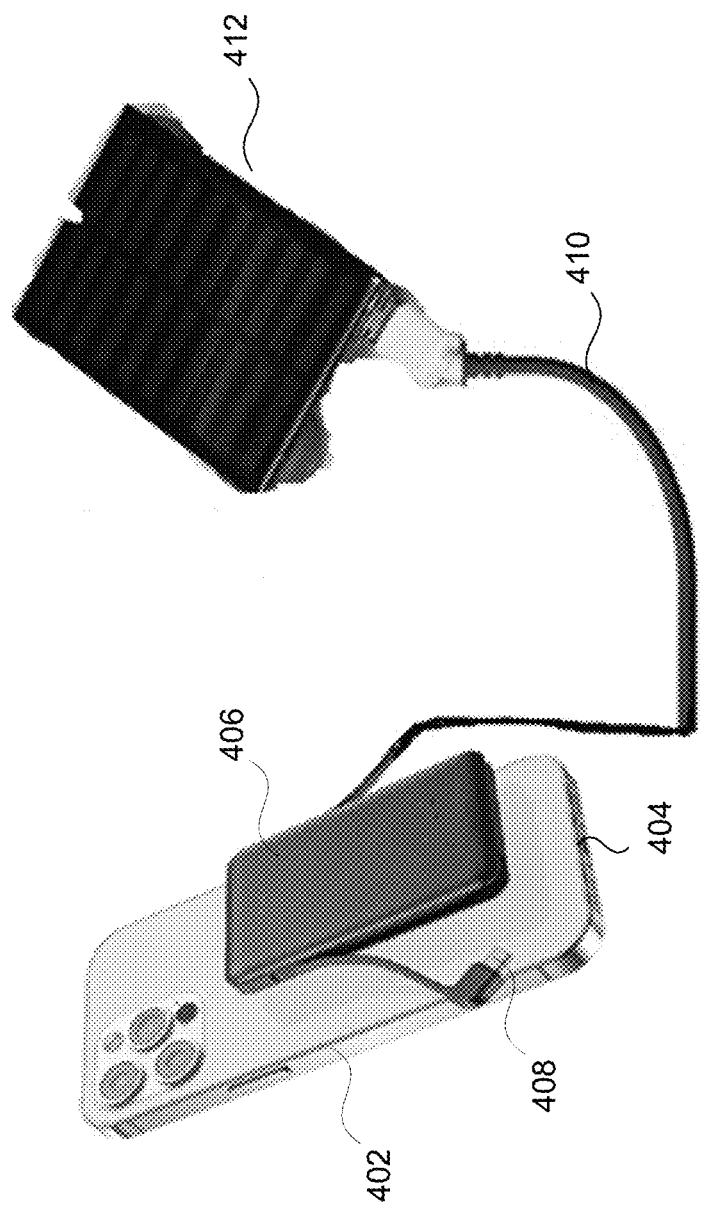
FIG. 4 is an illustration of embodiments of the disclosed apparatus in which a portable USB device, such as a cell phone, can be coupled to a power bank to provide power through the USB Port.

FIG. 4 is an illustration of a one embodiment of the disclosed apparatus in which a portable USB device, such as a cellphone 402 with a USB Port 404 can be coupled to a power bank 406 having a USB connector 408 to provide power to the cellphone 402 through the USB Port 404 of the cellphone 402. The power bank 406 is similar to the power banks discussed above 200, 300. In some embodiments, the power bank 406 has a magnetic couple, hook and loop material (such as Velcro®) or other means (not shown) to secure the power bank 406 to the cellphone 402. A connecting cable 410 provides external power from an external power source, such as a small portable solar power module 412.

Figure 5:
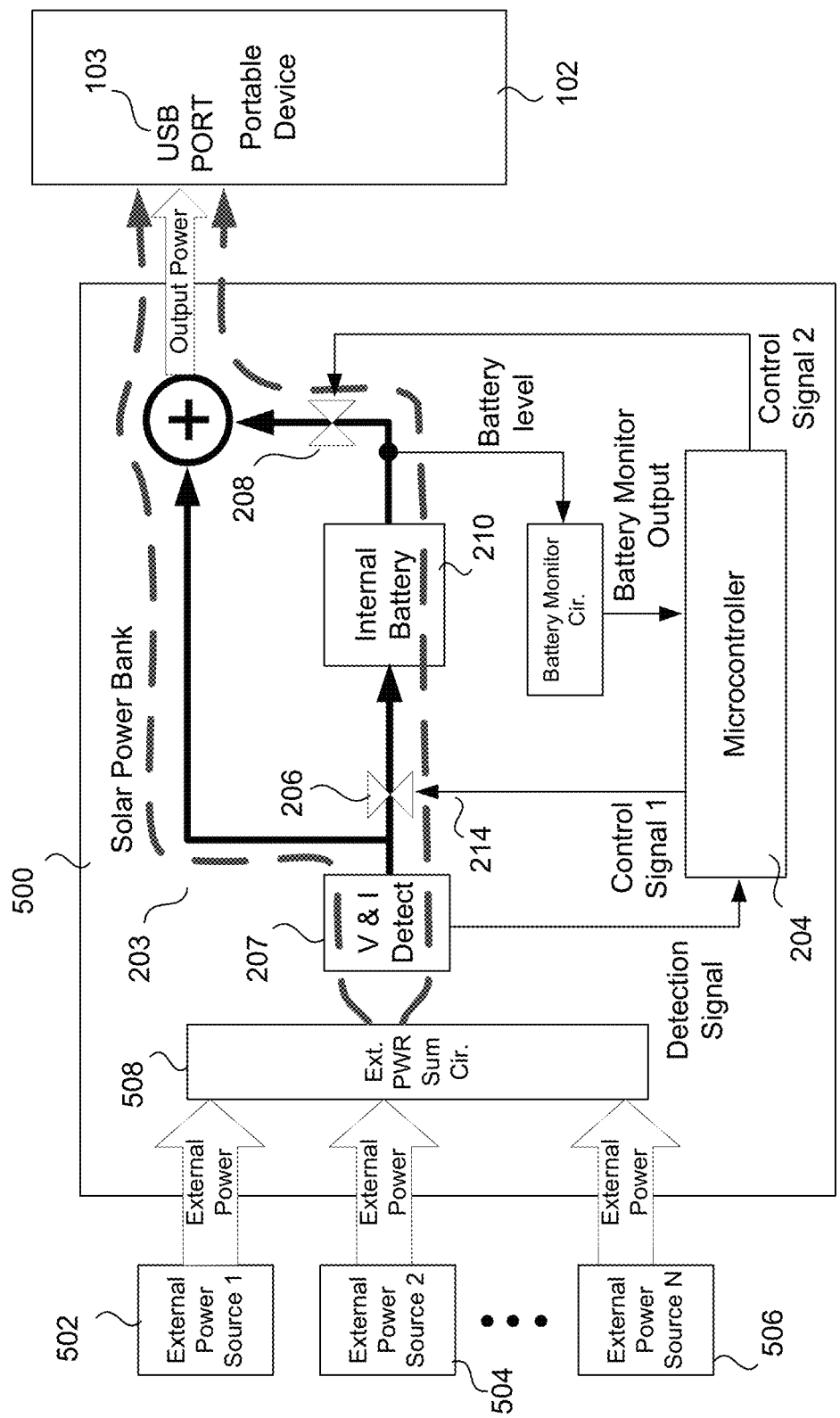
FIG. 5 is an illustration of an embodiment of the disclosed method and apparatus in which a power bank receives power from multiple external power sources.

FIG. 5 is an illustration of an embodiment of the disclosed method and apparatus in which a power bank 500 receives power from multiple external power sources 502, 504, 506. While three sources are expressly shown, any number of such sources may be summed. Furthermore, the sources may differ in the manner in which the power is derived. For example, one or more of the following types of external power sources may be used: solar panel, wall outlet connected DC power supply/charger, hand crank power generator, small windmill, etc. Yet another external power source may be a portable external rechargeable battery. In some embodiments, connectors for a number of such external power sources are provided on the power bank 500 and an internal power sum circuit 508 within the power bank 300 sums the power provided by each of the external power sources 502, 504, 506.

In some embodiments, the external power sum circuit 508 includes diodes (not shown) that block current from flowing from one external power source to another if the voltage of each source is not identical. In addition, in some embodiments, the external power sum circuit 508 includes circuitry that balances the amount of current that is drawn from each of the external power sources 502, 504, 506. Such sum circuits are well known in the art, as demonstrated by websites such as those with the following URLs:

https://www.asme.org/topics-resources/content/how-to-connect-power-supplies-in-parallel-or-series-for-increased-output-power; and
http://plaza.obu.edu/corneliusk/ec/VnP.pdf The output of the sum circuit 508 is then coupled to the voltage and current detection device 207. The rest of the power bank 500 is the same as was discussed above with respect to the power bank 200.

Figure 6:
FIG. 6 is an illustration of a power bank with a solar panel.

FIG. 6 is an illustration of a power bank 600 with solar panel 602. In other embodiments, any power generator might be provided to supply power to the power bank 600. In some embodiments, one or more light sources 604 such as LEDs are also integrated into the case of the power bank 600.

Figure 7:
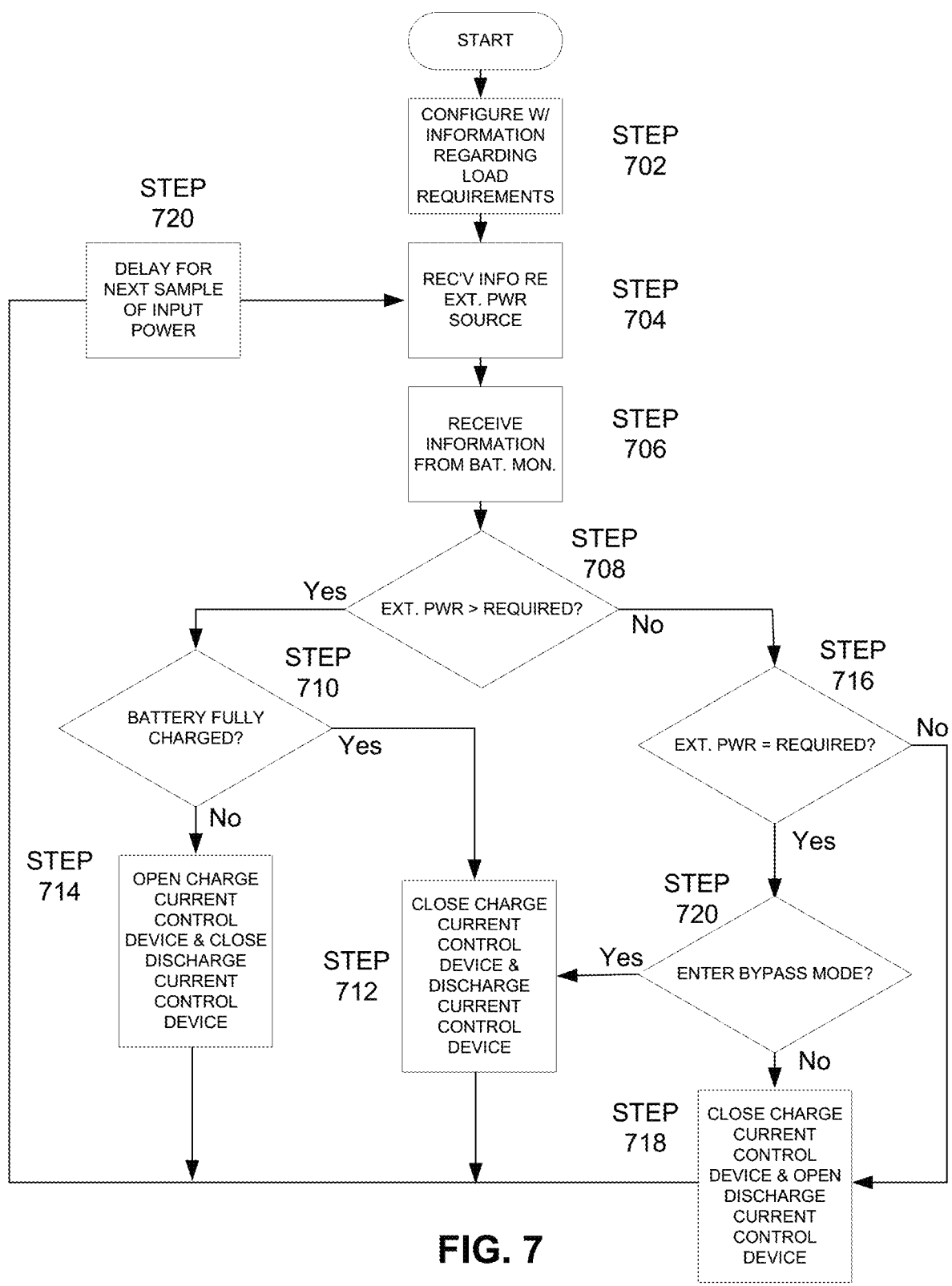
FIG. 7 is a flowchart of some embodiments of the disclosed method implemented by a power bank control device.

FIG. 7 is a flowchart of the method implemented by a power bank control device, such as a microcontroller within a power bank, firmware driven control device or programmable control device, such as a microprocessor, etc. Initially, the power bank control device is configured with information regarding the load that this to be connected to the power bank (STEP 702). In addition, at a regular sampling interval, the power bank control device receives real time information regarding the external power source, such as the amount of current being provided by the external power source and the voltage at which the current is being delivered (STEP 704). The power bank control device also receives information from a battery monitor circuit within the power bank regarding the state of an internal battery within the power bank (STEP 706).

Next, the power bank control device uses the received information to determine whether the external power source can deliver more power than is required by the load (STEP 708). If so, the power bank control device determines from the information received from the battery monitor circuit, whether the internal battery within the power bank is fully charged (STEP 710). If the battery is fully charged, then the power bank control device closes both the input and output FETs (i.e., the CCDs that controls the flow of current into and out of the internal battery of the power bank) (STEP 712) and the power bank control device returns to STEP 702. With respect to the embodiment of FIG. 2, the CCDs 206, 208 will not pass any current (i.e., are closed). That is, since the external power source can provide all the power required by the load and the battery 307 is fully charged, the power bank operates in "bypass mode" in which the battery is essentially disconnected from both the external power source 302 and from the load (i.e., the load switch 314).

If, on the other hand, the external power source 302 is capable of providing more power than is required by the load and the battery 307 is not fully charged (STEP 710), then the power bank control device sends control signals to the charge current control device (e.g., CCD1 206 of FIG. 2) to allow the charge current device to pass current to the battery 307 within the power bank 300 and sends a signal to the discharge current control device (e.g., CCD2 208 of FIG. 2) to block current from flowing from the battery 307 (STEP 714). The power bank control device then returns to STEP 702 after some time delay for sampling interval.

Returning to STEP 708, if the power bank control device determines that the external power source is not capable of delivering more power than the load requires, a determination is made as to the amount of power that the external power source can provide is equal to the amount required by the load (STEP 716). If not, then the external power source is incapable of providing the load with the amount of power required. In this case, the power bank control device sends control signals to the CCDs to close the charge current control device (e.g., CCD1 206) and open the discharge current control device (e.g., CCD2 208) (STEP 718). In this way, the battery can provide power to supplement the power provided by the external power source to meet the load requirements.

If, however, the external power source is capable of providing the amount of power required by the load (not no more), then the power bank control device can determine whether to enter bypass mode (STEP 720) and close the current paths to and from the internal battery within the power bank (STEP 712). In some embodiments, after a delay determined by the sampling interval (STEP 720), the power bank control device returns to STEP 704.

The microcontroller 308 orchestrates and combines multiple functions in a simultaneous and in real time manner. For example, the microcontroller 308: (1) processes the input power detected and communicated to the microcontroller on line 312 and line 306 and accordingly, controls the currents flowing into and out of the battery 307 through the FETs 316 and 318; (2) controls the booster current generated by the booster circuit 326 to provide the required output voltage; and (3) uses feedback from the CDD2 330 regarding the booster current to further fine control the FET 318 to modulate the current that flows from the battery 307. The net result of this combination of simultaneous functions is a constant power at the output of the power bank 300 that maximizes the direct flow from the input power to the output load and minimizes the use of the battery power.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A power bank comprising:
   a) a power bank output port;
   b) an external power source port coupled to the power bank output port;
   c) an internal power bank battery having a first battery terminal and second battery terminal;
   d) a first current control device (CCD1) having a CCD1 current-in terminal and a CCD1 current-out terminal and a CCD1 control terminal, the CCD1 current-in terminal coupled to the external power source port and the CCD1 current-out terminal being coupled to the first battery terminal, the CCD1 altering the amount of current flowing from the CCD1 current-in terminal to the CCD1 current-out terminal in response to signals applied to the CCD1 control terminal;
   e) a second current control device (CCD2) having a CCD2 current-in terminal and a CCD2 current-out terminal and a CCD2 control terminal, the CCD2 current-in terminal coupled to the first battery terminal and the CCD2 current-out terminal coupled to the external power source port, the CCD2 altering the amount of current flowing from the CCD2 current-in terminal to the CCD2 current-out terminal in response to signals applied to the CCD2 control terminal;
   f) a first current detection device having a CDD1 current-in terminal coupled to the external power source port, a CDD1 current-out terminal coupled to the CCD1 current-in terminal, and a CDD1 indication terminal configured to output a signal indicative of the amount of current flowing from the CDD1 current-in terminal to the CDD1 current-out terminal; and
   g) a power bank control device coupled to the CDD1 indication terminal, CCD1 control terminal and to the CCD2 control terminal and configured to apply signals to the CCD1 control terminal to alter the amount of current flowing from the CCD1 current-in terminal to the CCD1 current-out terminal and to apply signals to the CCD2 control terminal to alter the amount of current flowing from the CCD2 current-in terminal to the CCD2 current-out terminal in response to the signals received from the CDD1 indication terminal.

2. The power bank of claim 1, wherein the power bank control device is a microcontroller.

3. The power bank of claim 1, wherein the CCD1 and the CCD2 are each Field Effect Transistors (FETs).

4. The power bank of claim 1, wherein the power bank control device outputs PWM (pulse width modulated) signals to the CCD1 control terminal and to the CCD2 control terminal to alter the current flowing through each of CCD1 and CCD2, respectively.

5. The power bank of claim 1, further including:
   a) a bypass switch coupled to the power bank control device;
   wherein the power bank control device outputs signals to: (1) the CCD1 control terminal to alter current from flowing through the CCD1; and to (2) the CCD2 control terminal to alter current from flowing through the CCD2 in response to activation of the bypass switch.

6. The power bank of claim 1, further including:
   a) a boost circuit having a boost current-in terminal coupled to the CCD1 current-in terminal, a CDD2 current-out terminal coupled to the power bank output port, and boost control terminal coupled to the power bank control device.

7. The power bank of claim 6, wherein the power bank control device provides boost control signals to the boost control terminal to set a voltage at the boost current-out terminal to a desired constant voltage.

8. The power bank of claim 7, wherein the desired constant voltage is a USB specification compliant voltage.

9. The power bank of claim 6, wherein the boost circuit comprises:
   a) a second current detection device (CDD2) having a CDD2 indication port, the CDD2 configured to measure the amount of current flowing from the from the boost circuit and to indicate the amount of current flowing from the boost circuit on a signal output from the CDD2 indication port;
wherein the power bank control device applies signals to the CCD2 control terminal to alter the amount of current flowing from the CCD1 current-in terminal to the CCD1 current-out terminal and to applies signals to the CCD2 control terminal to alter the amount of current flowing from the CCD2 current-in terminal to the CCD2 current-out terminal in response to the signals received from both the CDD2 indication port and from the CDD1 indication terminal.

10. The power bank of claim 9, wherein the signals applied to the CCD2 control terminal by the power bank control device and the signals applied to the CCD2 control terminal maintain a constant current to be output through the power bank output port.

11. The power bank of claim 10, wherein the power bank control device provides boost control signals to the boost control terminal to set a voltage at the boost current-out terminal to a desired constant voltage.

12. The power bank of claim 1, further including a battery charger residing between the CCD1 and the battery, and configured to provide constant-current/constant-voltage linear charging to the battery, the battery charger having a first battery charger port and a second battery charger port, the first battery charger port coupled to the CCD1 current-out terminal and the second battery charger port coupled to the first battery terminal.

13. The power bank of claim 6, further comprising a load switch coupled between the boost circuit and the power bank output port, the load switch setting a constant maximum limit current to the power bank output port.

14. The power bank of claim 13, further comprising a resistor coupled to the load switch to configure the maximum current to be provided to the power bank output port.

15. The power bank of claim 1, further including:
   a) an external power sum circuit (EPSC) having a plurality of EPSC input ports and an EPSC output port, the EPSC output port coupled to the CCD1 current-in terminal; and
   b) a plurality of external power source connectors, each coupled to a corresponding one of the EPSC input ports.

16. A method for coupling an external power source to a load, the method comprising:
   a) determining the amount of current entering a power bank to which the external power source and the load are coupled;
   b) determining the amount of current leaving the power bank and entering the load;
   c) applying control signals to a first current control device to allow current to flow from the external power source to a battery within the power bank when the amount of current flowing from the power bank is greater than a predetermined amount of current to be provided by the power bank to the load; and
   d) applying control signals to a second current control device to allow current to flow from the battery within the power bank to the load when the amount of current flowing from the power bank is less than a predetermined amount of current to be provided by the power bank to the load.

17. The method of claim 16, wherein the signals applied to the first and second current control device ensure that a constant current flows from the power bank to the load.

18. The method of claim 16, wherein the signals applied to the first and second current control devices are pulse width modulated signals.

19. The method of claim 16, wherein a microcontroller within the power bank provides the control signals to the first and second current control device.

20. The method of claim 16, further comprising controlling the current that flows within a booster circuit within the power bank to ensure a constant voltage from the power bank to the load.

21. The method of claim 20, wherein a microcontroller within the power bank provides control signals to a third current control device within the booster circuit to ensure the control voltage from the power bank to the load.

22. The method of claim 21, wherein the control signals provided by the microcontroller to the third current control device are pulse width modulated signals.

23. The method of claim 16, wherein the first and second current control devices are field effect transistors.

24. The method of claim 16, further including activating a bypass switch to substantially prevent current from flowing through the first and second current control devices.

25. The method of claim 16, further including;
   a) determining that power provided from the external power source is substantially equal to the power requirement of the load; and
   b) preventing substantial current flow through the first and second current control devices in response to determining that the external power source is substantially equal to the power requirement of the load.

* * * * *